United States Patent
Yang (10) Patent No.: US 7,466,505 B2
(45) Date of Patent: Dec. 16, 2008

(54) DUMMY WRITE METHOD FOR IMPROVING PERFORMANCE OF DATA STORAGE SYSTEM AND APPARATUS THEREFOR

(75) Inventor: Won-choul Yang, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 643 days.

(21) Appl. No.: 10/234,846

(22) Filed: Sep. 5, 2002

(65) Prior Publication Data

US 2004/0179286 A1    Sep. 16, 2004

(30) Foreign Application Priority Data

Sep. 7, 2001    (KR) .............................. 2001-55053

(51) Int. Cl.
*G11B 27/36*    (2006.01)

(52) U.S. Cl. ............................................ 360/31

(58) Field of Classification Search .............. 360/48, 360/59, 53, 75, 31, 126, 128, 234.7, 324.12; 438/3; 369/59.25, 13.27, 47.14; 324/212; 714/723, 30, 703
See application file for complete search history.

(56) References Cited

U.S. PATENT DOCUMENTS

| | | | | |
|---|---|---|---|---|
| 4,734,901 A | * | 3/1988 | Murakami | 369/59.25 |
| 5,060,208 A | * | 10/1991 | Nagai et al. | 369/13.27 |
| 5,615,335 A | * | 3/1997 | Onffroy et al. | 714/30 |
| 5,682,272 A | * | 10/1997 | Taroda et al. | 360/53 |
| 5,991,113 A | * | 11/1999 | Meyer et al. | 360/75 |
| 6,069,760 A | * | 5/2000 | Yun | 360/53 |
| 6,088,177 A | * | 7/2000 | Onoda et al. | 360/48 |
| 6,441,982 B1 | | 8/2002 | Fukushima et al. | |
| 6,480,452 B2 | * | 11/2002 | Miyauchi et al. | 369/59.25 |
| 6,483,794 B2 | * | 11/2002 | Miyauchi et al. | 369/59.25 |
| 6,487,156 B2 | * | 11/2002 | Miyauchi et al. | 369/59.25 |
| 6,519,219 B2 | * | 2/2003 | Miyauchi et al. | 369/59.25 |
| 6,650,491 B2 | * | 11/2003 | Suzuki et al. | 360/31 |
| 6,650,608 B2 | * | 11/2003 | Miyauchi et al. | 369/59.25 |
| 6,683,736 B2 | * | 1/2004 | Takahashi | 360/31 |
| 6,700,369 B1 | * | 3/2004 | Makuuchi et al. | 324/212 |
| 6,737,281 B1 | * | 5/2004 | Dang et al. | 438/3 |
| 6,760,191 B1 | * | 7/2004 | Yan et al. | 360/128 |
| 6,842,308 B1 | * | 1/2005 | Pust et al. | 360/234.7 |
| 6,859,343 B1 | * | 2/2005 | Alfoqaha et al. | 360/126 |
| 6,876,509 B2 | * | 4/2005 | Bonin et al. | 360/75 |
| 6,876,526 B2 | * | 4/2005 | Macken et al. | 360/324.12 |
| 6,922,801 B2 | * | 7/2005 | Archibald et al. | 714/723 |
| 7,149,160 B2 | * | 12/2006 | Kibashi et al. | 369/47.14 |
| 2001/0042230 A1 | * | 11/2001 | Williams et al. | 714/703 |

FOREIGN PATENT DOCUMENTS

JP    2000-163703    6/2000

* cited by examiner

*Primary Examiner*—Fred Tzeng
(74) *Attorney, Agent, or Firm*—Staas & Halsey LLP (57) ABSTRACT

An apparatus for and a method of dummy writing in a data storage system. A dummy write is executed before executing a write mode and a write head pole tip is thermally fully expanded to reduce bit error rate occurring in the early writing. The dummy write is executed in inter sector gaps before the write mode is executed in the data storage system to thermally expand the head pole tip until the head pole tip is saturated. A level of a signal written in a sector in an initial write mode is lowered to prevent errors from occurring.

15 Claims, 5 Drawing Sheets

FIG. 5

DUMMY WRITE METHOD FOR IMPROVING PERFORMANCE OF DATA STORAGE SYSTEM AND APPARATUS THEREFOR

CROSS REFERENCE TO RELATED APPLICATIONS

This Application claims the benefit of Korean Application No. 2001-55053, filed Sep. 7, 2001 in the Korean Industrial Property Office, the disclosure of which is incorporated herein by reference.

BACKGROUND OF THE INVENTION

1. Field of the Invention

The present invention relates to a method of writing data in a data storage system and an apparatus therefor, and more particularly, to a method by which a dummy write is executed before executing a write mode, wherein a write head pole tip is fully thermally expanded to reduce bit error rate occurring early in the write mode, and an apparatus therefor.

2. Description of the Related Art

In general, a hard disk drive, which is one of a number of auxiliary memories of a computer, reproduces data written on the hard disk drive using a magnetic head or writes new data on the hard disk drive to contribute to a computer system. As storage capacity and storage density increase, and a physical size of the hard disk drive decreases, linear density, bits per inch (BPI), and the track density, tracks per inch (TPI), of the hard disk drive increase. Thus, a method of more precisely and quickly controlling a position of a head of the disk drive and a delicate mechanism are required.

However, the tip of a pole on the head of the hard disk drive thermally expands depending on the ambient temperature. Thus, the pole tip is shrunk in the earlier writing, but thermally expands until saturation after the pole tip receives a write current for a predetermined time.

Figure 1:
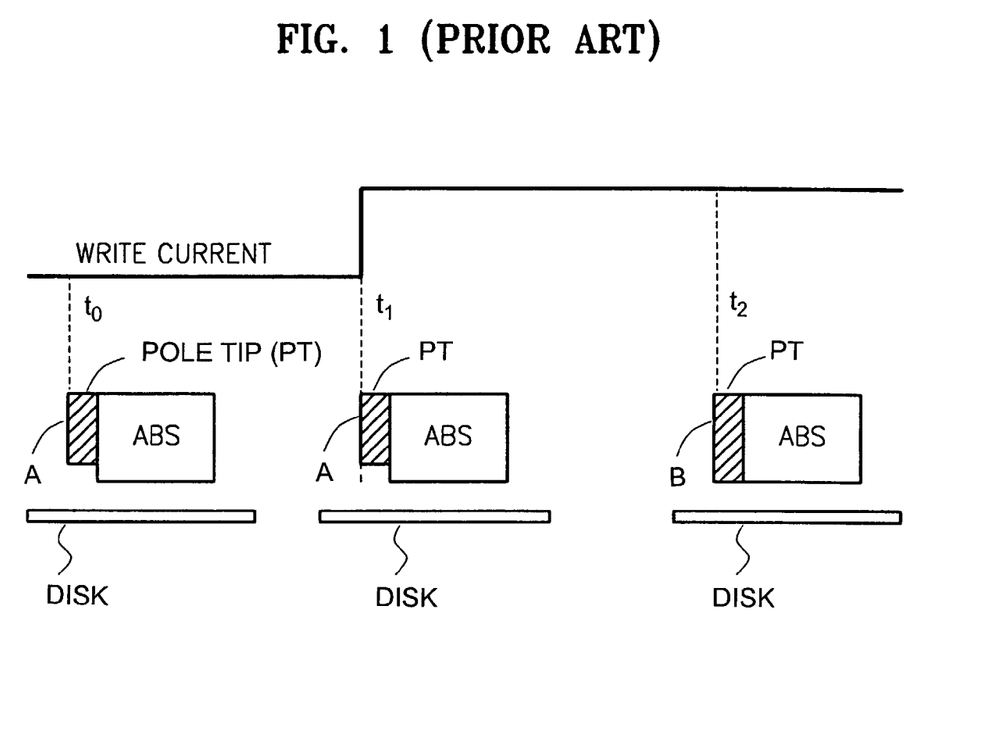
FIG. 1 is a progressive diagram showing thermal expansion of a head pole tip due to write current.

A waveform of a typical write current is shown in FIG. 1. In FIG. 1, the pole tip PT is shown attached to an air bearing surface ABS and disposed adjacent a recording medium (DISK). The ABS and pole tip are illustrated adjacent a time line of a write current waveform. During a period of time between $t_0$ and $t_1$, the pole tip PT is shrunk to a size A because a temperature of the pole tip approaches an ambient temperature of the pole tip before writing begins. When the write current is supplied to the head due to a write command at the time $t_1$, the pole tip PT initially remains in the shrunken state of the size A, and if the write current is supplied for a predetermined time $(t_2-t_1)$, the temperature of the pole tip increases and the pole tip thermally expands until saturation at a size B.

As a result, a flying height of the head from a disk surface changes and thus the flying height gradually decreases in the earlier writing until the pole tip thermally fully expands. Thus, where a signal written in an early stage of a write current application is reproduced, the level of the signal is attenuated, and as a result, errors occur where data written in an initial sector is reproduced. In particular, the probability that errors will occur in the initial sector is higher if the ambient temperature is low.

SUMMARY OF THE INVENTION

To solve the above and other problems, it is a first object of the present invention to provide a method of dummy writing for improving performance of a data storage system by which a dummy write is performed while a pole tip of a head thermally expands until saturation before executing a write mode which writes useable data to the disk.

It is a second object of the present invention to provide an for performing dummy writing for improving the performance of the data storage system.

Additional objects and advantages of the invention will be set forth in part in the description which follows, and, in part, will be obvious from the description, or may be learned by practice of the invention.

Accordingly, to achieve the the above and other objects, there is provided a method of dummy writing for improving the performance of a data storage system by which writing in the data storage system is controlled. In the method of dummy writing, it is determined whether a write command is input. The number of sectors in which a dummy write is to be executed is established and the dummy write is executed in predetermined areas in a track for a predetermined time in correspondence to the established number of sectors if the write command is input. A write mode is executed after ending the dummy write.

To achieve the above and other objects, there is also provided an apparatus for dummy writing for improving the performance of a data storage system having a controller for controlling a series of processes of reproducing data from a storing medium and writing data on the storing medium. The controller includes hardware and software for executing a dummy write process for a predetermined time before executing a write mode if the controller receives a write command from a host computer.

BRIEF DESCRIPTION OF THE DRAWINGS

The above object and advantages of the present invention will become more apparent by describing in detail embodiments thereof with reference to the accompanying drawings in which.

DETAILED DESCRIPTION OF THE PREFERRED EMBODIMENTS

Reference will now be made in detail to the present embodiments of the present invention, examples of which are illustrated in the accompanying drawings, wherein like reference numerals refer to like elements throughout.

Figure 2:
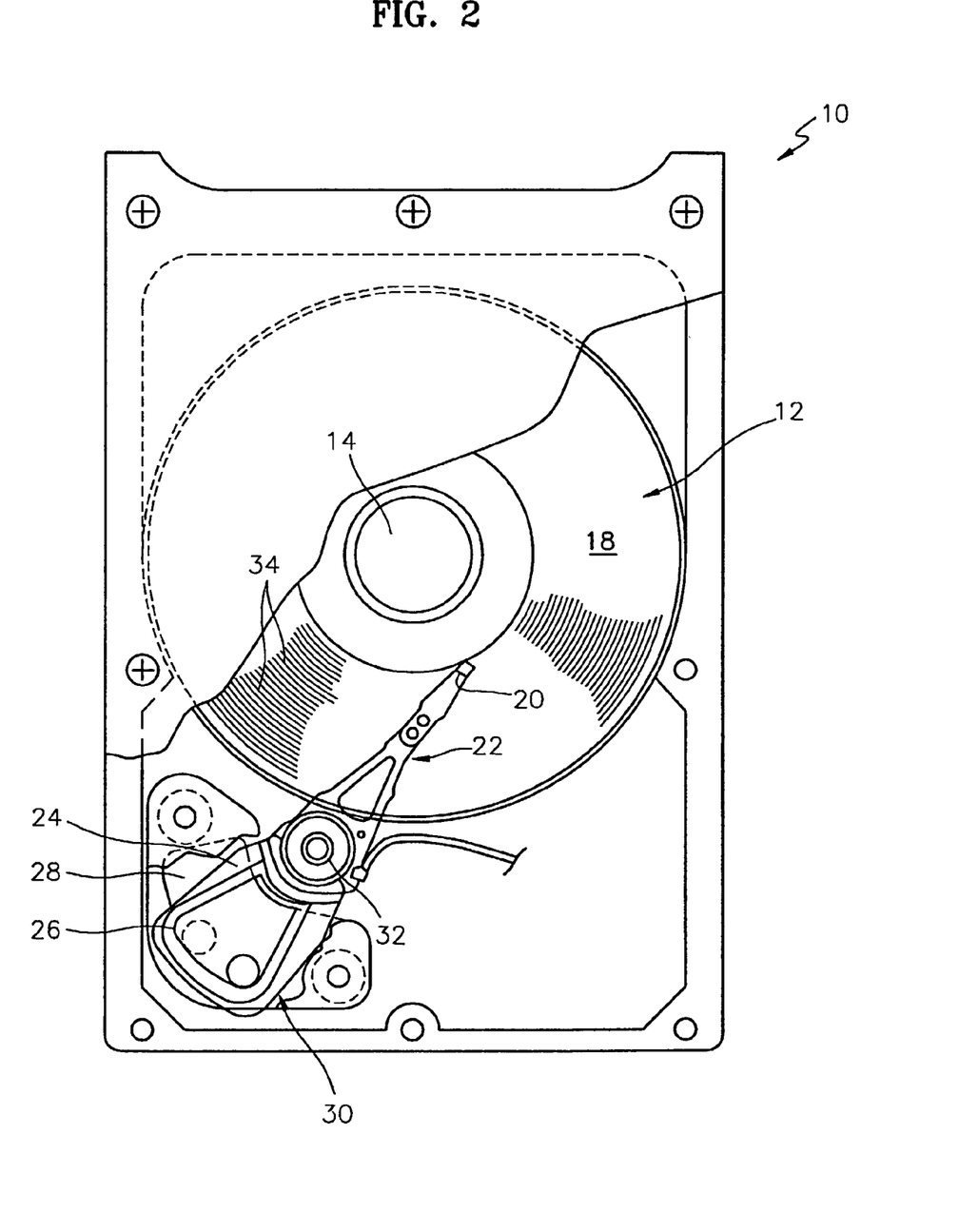
FIG. 2 is a plan view of a hard disk drive according to an embodiment of the present invention.

FIG. 2 is a plan view of a hard disk drive 10 according to the present invention. The hard disk drive 10 includes at least one magnetic disk 12 which is rotated by a spindle motor 14. The hard disk drive 10 also includes a transducer (not shown) which is located adjacent to a disk surface 18.

The transducer senses and magnetizes a magnetic field of the magnetic disk 12 to read or record data from/in the magnetic disk 12 which is rotating. In general, the transducer communicates with the disk surface 18. The transducer may be described as a single transducer, but it is understood that the transducer comprises a write transducer for magnetizing the magnetic disk 12 and a read transducer comprises a magneto-resistive (MR) device which is separate from the write transducer. The MR transducer senses the magnetic field of the magnetic disk 12.

The transducer may be integrated into a head 20. The head 20 directs airflow that acts as a bearing between the transducer and the disk surface 18. The head 20 is combined onto a head stack assembly (HSA) 22 which is attached to an actuator arm 24 having a voice coil 26. The voice coil 26 is adjacent to a magnetic assembly 28 of a voice coil motor (VCM) 30. Current supplied to the voice coil 26 generates torque which rotates the actuator arm 24 with respect to a bearing assembly 32. The rotation of the actuator arm 24 moves the transducer across the disk surface 18.

Figure 5:
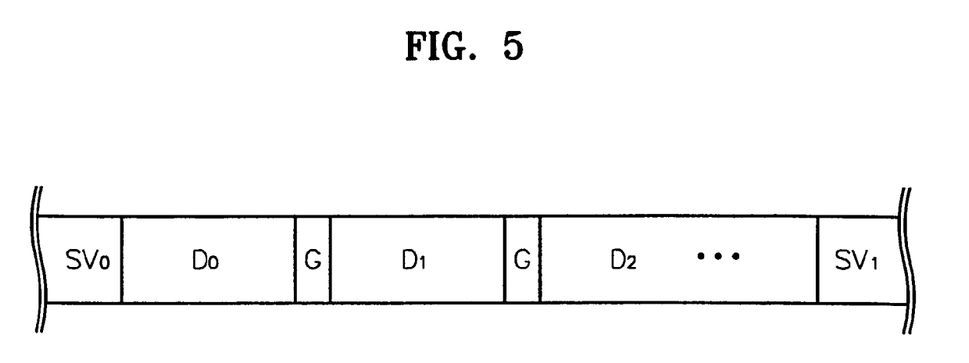
FIG. 5 is a general data format of a disk.

Information is generally stored in annular tracks of the magnetic disk 12. As shown in FIG. 5, each track 34 generally includes a plurality of sectors, a representative one of which is shown. Each sector is formed of a servo field, a plurality of data fields and a plurality of inter sector gaps. In FIG. 5, $SV_0$, designates the servo field for the representative sector, data fields $D_0$, $D_1$ and $D_2$ are among the plurality of data fields for the representative sector and each G represents an inter sector gap (ISG) which exists between the data fields. An identification field (not shown) is included in the servo field. The designation $SV_1$ corresponds to the servo field in a following sector. The identification field includes a gray code for identifying a sector and a track. The transducer moves across the disk surface 18 to read or record information on another track.

Figure 3:
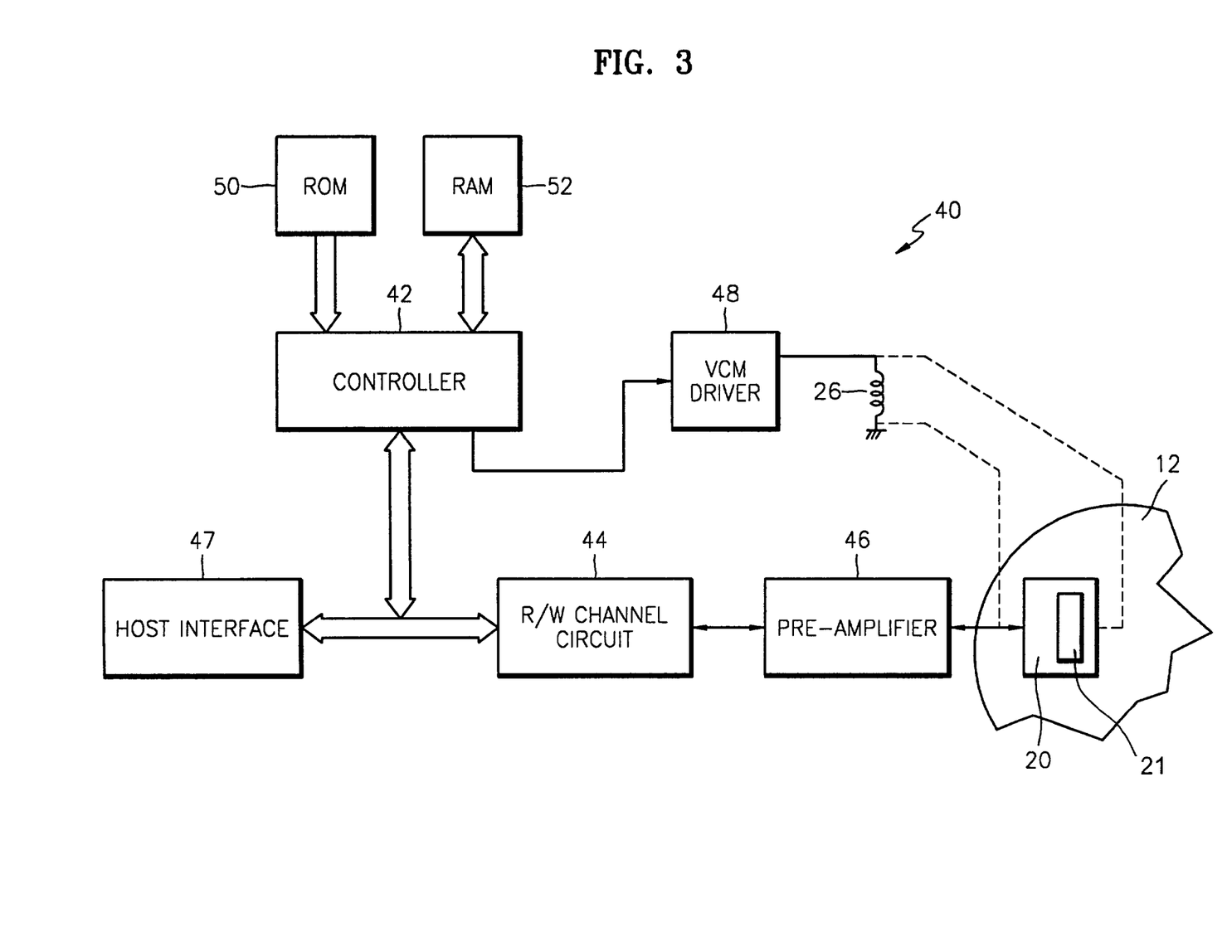
FIG. 3 is a circuit diagram of control system for controlling the hard disk drive of FIG. 2.

FIG. 3 shows an electric system 40 which controls the hard disk drive 10. The electric system 40 comprises a controller 42 which is connected to a head 20 via a read/write (R/W) channel circuit 44 and a pre-amplifier circuit 46. The controller 42 may be a digital signal processor (DSP), a microprocessor, a microcontroller, or the like. The controller 42 supplies a control signal to the R/W channel circuit 44 to read information from a disk 12 or write information on the disk 12. Information is generally transmitted from the R/W channel circuit 44 to a host interface circuit 47. The host interface circuit 47 includes a buffer memory (not shown) and a control circuit (not shown) which permits a disk drive to interface with a system such as a personal computer.

The R/W channel circuit 44 converts an analog signal that is read from the head and amplified in the pre-amplifier 46 in a reproduction mode into a digital signal that is readable by a host computer (not shown) and outputs the digital signal to the host interface 47. Also, the R/W channel circuit 44 converts a signal in response to input user data from the host computer via the host interface 47 into write current, which is amplified in the pre-amplifier 46 to write the user data on the disk.

The controller 42 is connected to a voice coil motor (VCM) driver 48 which supplies driving current to the voice coil 26. The controller 42 supplies a control signal to the VCM driver 48 to control excitation of the VCM driver 48 and the motion of the transducer.

The controller 42 is connected to a nonvolatile memory such as a read only memory (ROM) or flash memory device 50 and to a random access memory (RAM) device 52. The memory devices 50 and 52 include commands and data used by the controller 42 to execute a software routine. The software routine includes a seek routine which moves the transducer from one track to another track and a following routine which finds a target sector in the track. The seek routine includes a servo control routine for guaranteeing the accurate movement of the transducer to a track. For example, the memory device 50 includes acceleration, velocity, and position trajectory equations of the motion of the transducer.

Figure 4:
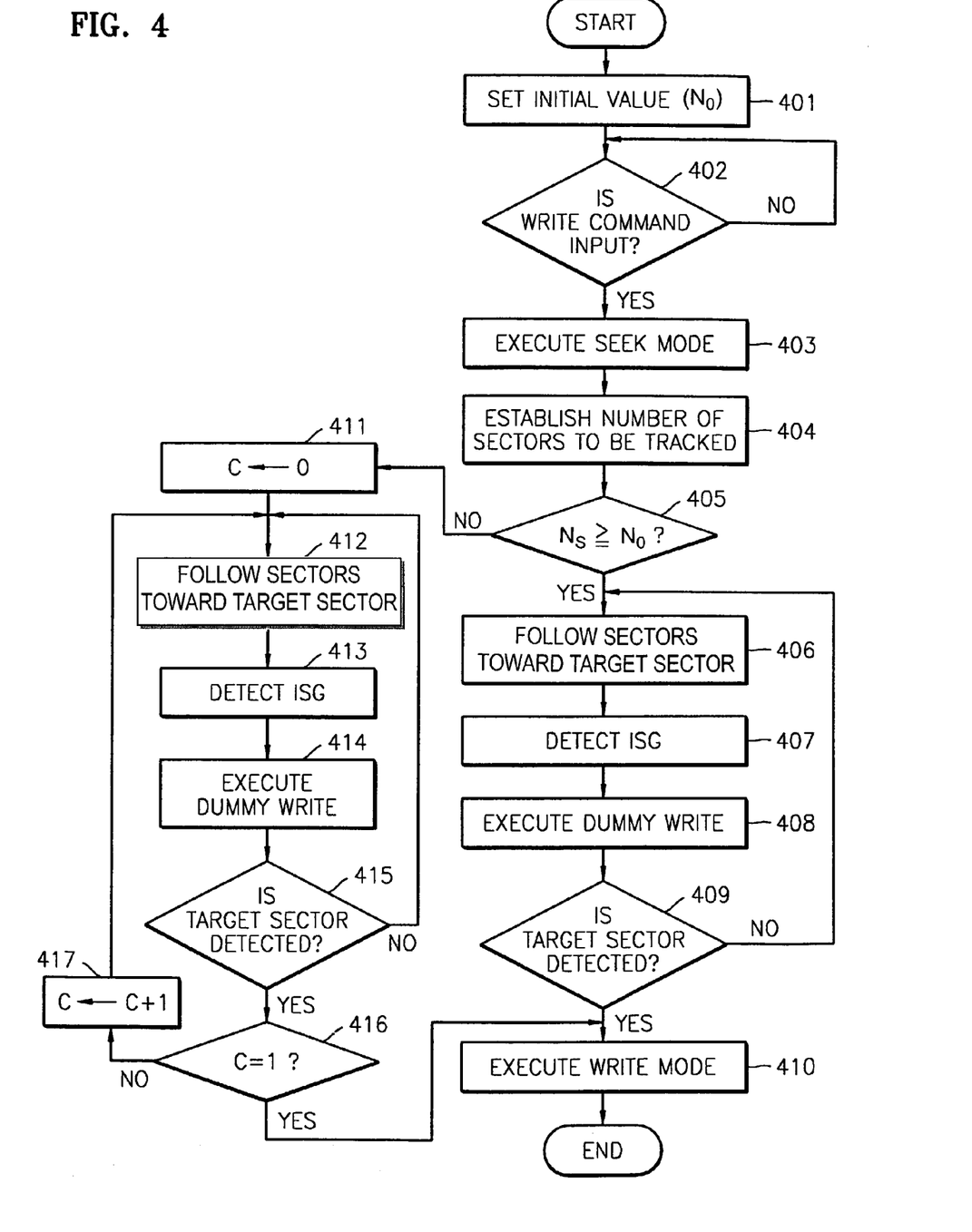
FIG. 4 is a flowchart of a method of dummy writing according to the present invention.

In the present invention, in order to reduce initial writing failure, the memories 50 and 52 store a dummy write execution program, shown in FIG. 4, for executing a dummy write before executing a write mode.

Thus, if the controller 42 receives a write command from the host interface 47, the controller 42 executes the dummy write execution program stored in the memories 50 and 52, moves the transducer to a target sector, executes the dummy write mode in ISGs, and controls peripheral circuits to execute a normal write mode.

A control operation for a dummy write execution program for the controller 42 will be described in detail with reference to the flowchart shown in FIG. 4.

A critical value $N_0$ (N sub zero) corresponding to an initial value is set and stored in the memories 50 and 52 in operation 401. The critical value $N_0$ is set to be a number of sectors which includes a minimum number of ISGs necessary to expand a head pole tip of a recording/reproducing head until the head pole tip is saturated due to dummy writing in the ISGs. For example, the critical value $N_0$ may be set to be the number of sectors in half of a track.

If the controller 42 receives a write command from the host interface 47 in operation 402, the controller 42 executes a seek mode for controlling the VCM driver 48 to move the transducer provided with the head 20 from a current track of the disk in which the head 20 is positioned to the target track in operation 403.

The controller 42 establishes a number $N_S$ of sectors to be tracked to move the head from a current sector to a target sector in operation 404 due to the execution of the seek mode. The number $N_S$ corresponds to a difference between a number of the target sector and a number of the current sector in which the head 20 is positioned at the execution of the seek mode.

The critical value $N_0$ stored in the memories 50 and 52 is read and compared with the number $N_S$ of sectors to be tracked in operation 405.

If $N_S$ is greater than or equal to $N_0$, the ISGs are detected by following the target sectors in operations 406 and 407. In this case, if the dummy write is executed in the ISGs included in the target sectors to be tracked, the head pole tip is thermally expanded until the head pole tip is saturated by the time the head reaches the target sector.

The hard disk drive comprises at least one disk having a plurality of tracks, each of which includes a plurality of sectors. Also, each sector comprises a servo field which further comprises an identification field, and a plurality of data fields. As shown in FIG. 5, ISGs exist between the data fields.

The controller 42 controls the R/W channel circuit 44 and the pre-amplifier 46 to execute the dummy write in the detected ISGs in operation 408. As a result, the dummy write is executed in the detected ISGs until the head 20 reaches the target sector in operation 409. The execution of the dummy write thermally expands the head pole tip until the head pole tip is saturated before the write mode is executed in the target sector. That is, as the head travels along a path between the current sector and the target sector, an ISG along the path is detected and a dummy write is performed in the detected ISG. If the target sector is detected at operation 409, the write mode is executed. If the target sector is not detected at operation 409, the controller returns to operation 406 and operations 407 and 408 are repeated for a next ISG until the target sector is detected at operation 409.

The dummy write mode ends and a write mode for writing data that is transmitted from the host interface 47 is executed in operation 410 if the target sector is detected at operation 409.

However, if the number $N_S$ of sectors to be tracked in progressing from the current sector to the target sector is determined to be smaller than the critical value $N_0$ in operation 405, the head pole tip is not expected to be thermally expanded to saturation while dummy writing in progressing from the current sector to the target sector in the manner described with respect to operations 406, 407, 408 and 409.

If the number $N_S$ of sectors to be tracked between the current sector and the target sector is smaller than the critical value $N_0$ in operation 405, a counter C is reset to "0" in operation 411.

A following mode for tracking the target sector is executed in operation 412. In the following mode, ISGs in the track between the current sector and an ISG is detected at in operation 413. In operations 414 a dummy write is executed in the detected ISG and at operation 415, it is determined whether the head 20 reaches the target sector with execution of the dummy write in the detected ISG.

If the target sector is detected at operation 415, it is determined whether a value of the counter C is "1" at operation 416. If the value of the counter C is not "1," the value of the counter C is increased by "1" at operation 417, the controller returns to operation 412, and the following mode is repeated.

A case where the value of the counter C is "1" means that the dummy write is executed in all ISGs in one track and thus the head pole tip is thermally expanded until the head pole tip is saturated, where the critical value $N_0$ is determined to be the number of sectors in half of a track. Thus, a write mode for writing data that is transmitted from the host interface 47 is executed in the detected target sector in operation 410.

As described above, according to the present invention, a dummy write is executed in ISGs before a write mode is executed in a recording medium of a data storage system to thermally expand a head pole tip until the head pole tip is saturated. A level of a signal written in a sector in an initial write mode is lowered to prevent errors from occurring.

The present invention may be executed as a method, an apparatus, a system or the like. The elements of the present invention are code segments which execute necessary operations if the present invention is executed as software. Programs or code segments may be stored in a processor readable medium or may be transmitted by a computer data signal combined with a carrier wave in a transmission medium or communication network. The processor readable medium may include any medium which is capable of storing and transmitting information. The processor readable medium may include at least one of an electronic circuit, a semiconductor memory device, a ROM, a flash memory, an erasable ROM (EROM), a floppy disk, an optical disk, a hard disk, an optical fiber medium, a radio frequency (RF) net, or the like. The computer data signal may include any signal which may be transmitted over a transmission medium such as an electronic net channel, an optical fiber, air, electromagnetic field, a RF net, or the like.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of improving data writing in a data storage system, the method comprising:
    determining whether a write command is input;
    establishing a number of sectors in which a dummy write is to be executed;
    executing the dummy write in predetermined areas in a track for a predetermined time in correspondence with the established number of sectors if the write command is determined to be input; and
    executing a write mode after ending the dummy write,
    wherein the predetermined time is a minimum time required for thermally expanding a head pole tip until the head pole tip is saturated using write current.

2. The method of claim 1, wherein the predetermined areas are inter sector gaps in a target track.

3. A method of improving data writing in a data storage system, the method comprising:
    determining whether a write command is input;
    establishing a number of sectors in which a dummy write is to be executed;
    executing the dummy write in predetermined areas in a track for a predetermined time in correspondence with the established number of sectors if the write command is determined to be input; and
    executing a write mode after ending the dummy write
    wherein the predetermined areas are inter sector gaps in a target track, and
    wherein the establishing of the number of sectors comprises:
    executing a seek mode which moves a head to the target track if the write command is input;
    establishing the number of sectors to be tracked from a current sector in which the head is positioned to the target sector after completing the seek mode;
    comparing the number of sectors to be tracked with a predetermined critical value; and
    executing the dummy write in the inter sector gaps by following the target sector if the number of sectors to be tracked is greater than or equal to the critical value and if not, executing the dummy write in the inter sector gaps by following the target sector after executing the dummy write in the inter sector gaps included in one rotation of the target track.

4. The method of claim 3, wherein the predetermined critical value is set to the number of sectors which includes a minimum number of the inter sector gaps required to thermally expand the head pole tip to a state of saturation due to the execution of the dummy write in the inter sector gaps.

5. The method of claim 3, wherein the predetermined critical value is set to the number of sectors in half of a track.

6. An apparatus for reproducing data from and/or recording data to a data storage system having a storage medium, comprising:
    a recording/reproducing head further comprising a head pole tip; and
    a controller which controls processes of reproducing the data from the storing medium and/or processes of writing the data on the storing medium,
    wherein the controller comprises hardware and software which execute a dummy write process for a predetermined time before executing a write mode if the controller receives a write command from a host computer, wherein the controller:
    executes a seek mode which moves the head to a target track if the write command is input;
    establishes a number of sectors to be tracked which are included in a current sector in which the head is positioned to a target sector after completing the execution of the seek mode;
    compares the number of sectors to be tracked with a predetermined critical value; and executes the dummy write in inter sector gaps by following the target sector if the number of sectors to be tracked is greater than or equal to the critical value and if the number of sectors to be tracked is not greater than or equal to the critical value, executes the dummy write in the inter sector gaps by following the target sector after executing the dummy write in inter sector gaps including one rotation of the target track.

7. The apparatus of claim 6, wherein the controller sets the predetermined critical value to the minimum number of inter sector gaps in which the dummy data must be written in order to thermally expand the head pole tip to saturation during the dummy write.

8. The apparatus of claim 6, wherein the predetermined critical value is set to a number of sectors in half of a track.

9. A data storage system, comprising:
a magnetic disk having sectors in which storable data may be written and inter sector gaps between the sectors;
a spindle motor which rotates the magnetic disk;
an actuator arm;
a voice coil which drives the actuator arm;
a head mounted on the actuator arm and further comprising a transducer having a pole tip which writes data to and/or reads data from the magnetic disk in response to a current signal; and
a controller which controls the current signal to write dummy data in a predetermined number of the inter sector gaps prior to writing the storable data in a selected one of the sectors, wherein the predetermined number of inter sector gaps is determined as a number of gaps in which it is necessary to write the dummy data to fully thermally expand the pole tip prior to writing the storable data.

10. The apparatus of claim 9, wherein the controller determines a number of intervening inter sector gaps along a path between a current sector at which the head is positioned and a target sector to which the head is to be repositioned and compares the number of intervening gaps and the predetermined number of gaps.

11. The apparatus of claim 10, wherein the controller writes the dummy data in the predetermined number of the intervening inter sector gaps.

12. The apparatus of claim 10, wherein the controller writes the dummy data in at least one of the intervening gaps more than once.

13. A controller readable medium for operating a data storage system having a magnetic disk having sectors in which storable data may be written and inter sector gaps between the sectors and a transducer having a pole tip which writes data to and/or reads data from the magnetic disk in response to a current signal, the controller readable medium comprising:
a storage area which stores instructions which instruct the controller to:
determine whether a write mode is to be executed;
establish a predetermined number corresponding to a number of the inter sector gaps in which dummy data must be written in order to fully thermally expand the pole tip prior to writing recordable data on the magnetic disk:
execute a dummy write mode comprising writing dummy data in at least the predetermined number of inter sector gaps; and
execute a write mode after the execution of the dummy write mode.

14. The controller readable medium of claim 13, wherein the stored instructions further instruct the controller to:
determine an intervening number of inter sector gaps on a path between a current sector at which the head is positioned and a target sector to which the head is to be repositioned;
compare the intervening number of inter sector gaps and the predetermined number of inter sector gaps; and
if the intervening number of sectors is greater than or equal to the predetermined number of inter sector gaps, write the dummy data in at least the predetermined number of the inter sector gaps prior to writing the recordable data.

15. The controller readable medium of claim 13, wherein the stored instructions further instruct the controller to:
determine an intervening number of inter sector gaps on a path between a current sector at which the head is positioned and a target sector to which the head is to be repositioned;
compare the intervening number of inter sector gaps and the predetermined number of inter sector gaps; and
if the intervening number of sectors is less than the predetermined number, write the dummy data in the intervening inter sector gaps at least a number of times corresponding to the predetermined number, wherein the dummy data is written in at least one of the intervening inter sector gaps more than once.

* * * * *

UNITED STATES PATENT AND TRADEMARK OFFICE
CERTIFICATE OF CORRECTION

PATENT NO.        : 7,466,505 B2
APPLICATION NO.   : 10/234846
DATED             : December 16, 2008
INVENTOR(S)       : Won-choul Yang

Page 1 of 1

It is certified that error appears in the above-identified patent and that said Letters Patent is hereby corrected as shown below:

Column 6, Line 20, after "dummy write" insert --,--.

Signed and Sealed this

Seventeenth Day of March, 2009

JOHN DOLL
*Acting Director of the United States Patent and Trademark Office*